W. H. WILDRICK.
CAROUSEL.
APPLICATION FILED NOV. 7, 1910.
988,419.
Patented Apr. 4, 1911.
4 SHEETS—SHEET 2.
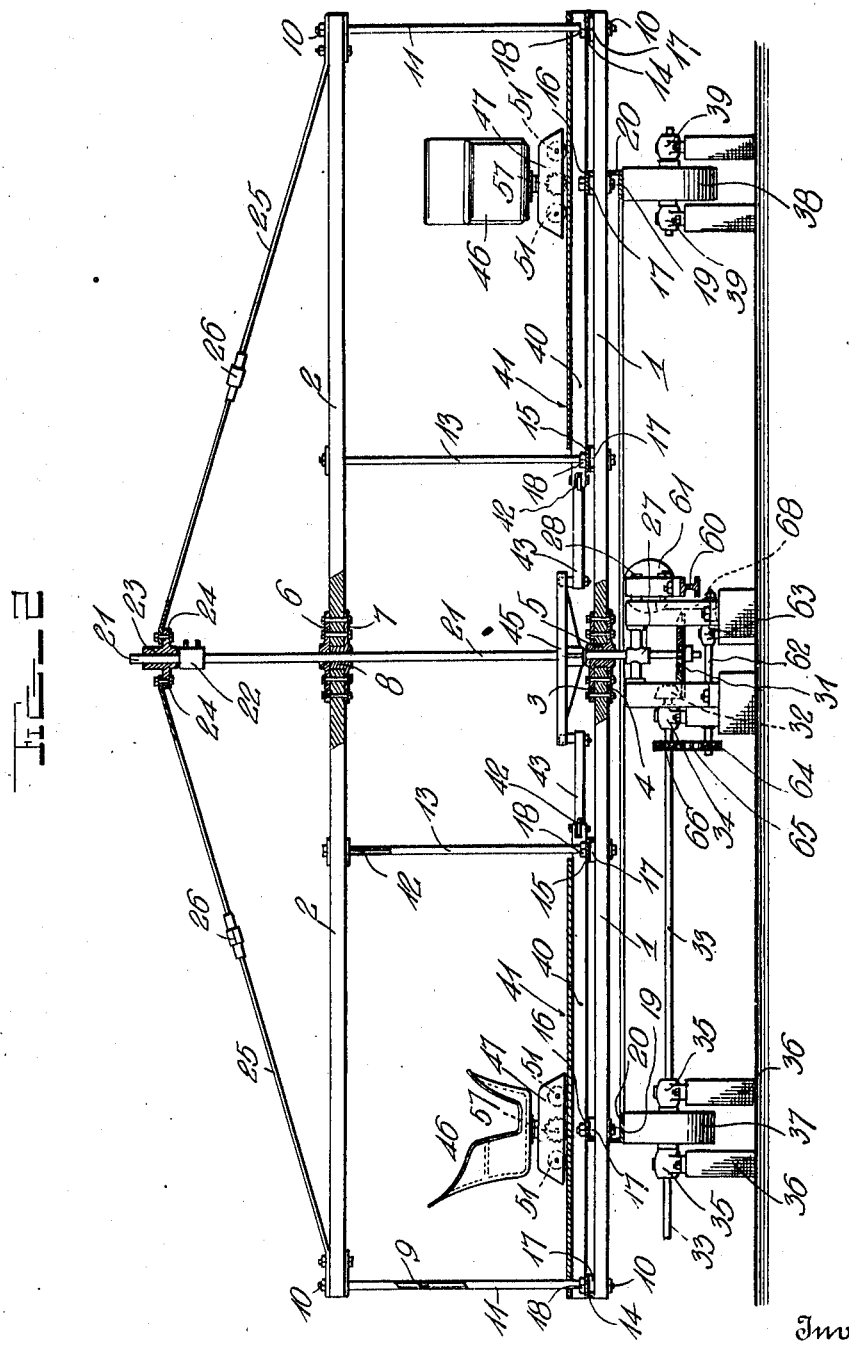
Witnesses
Inventor
W. H. Wildrick
by H. B. Willson & Co.
Attorneys

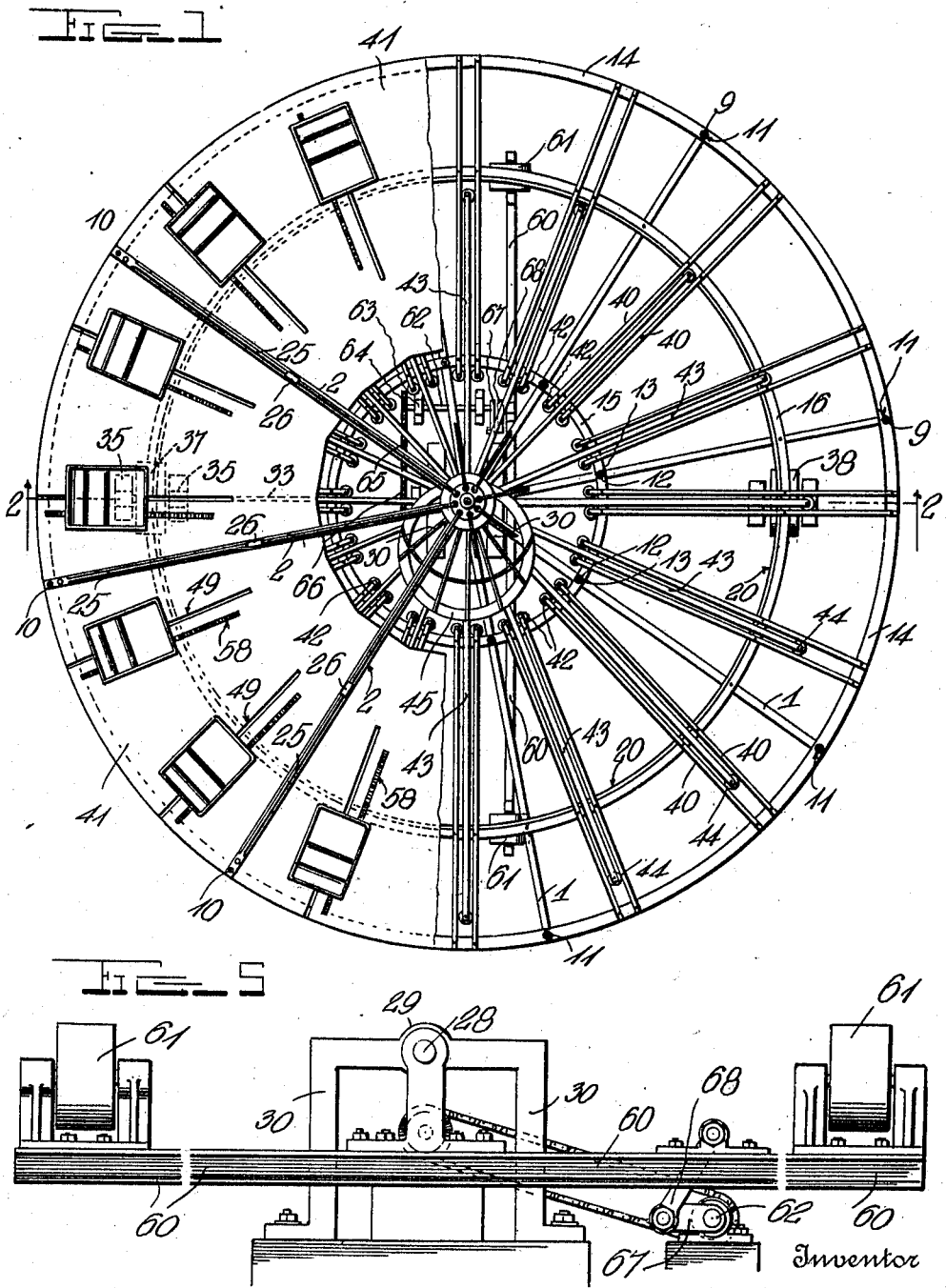

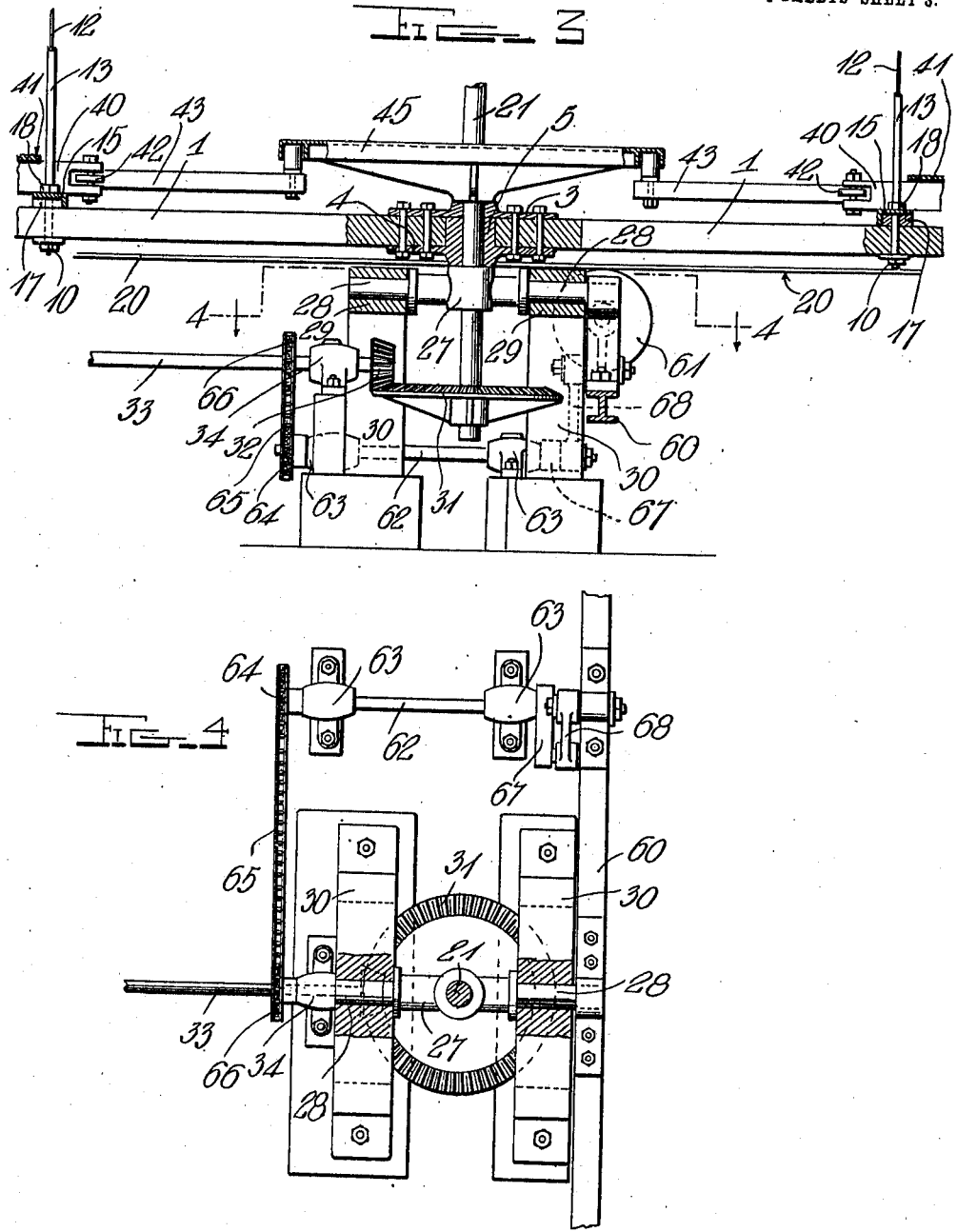

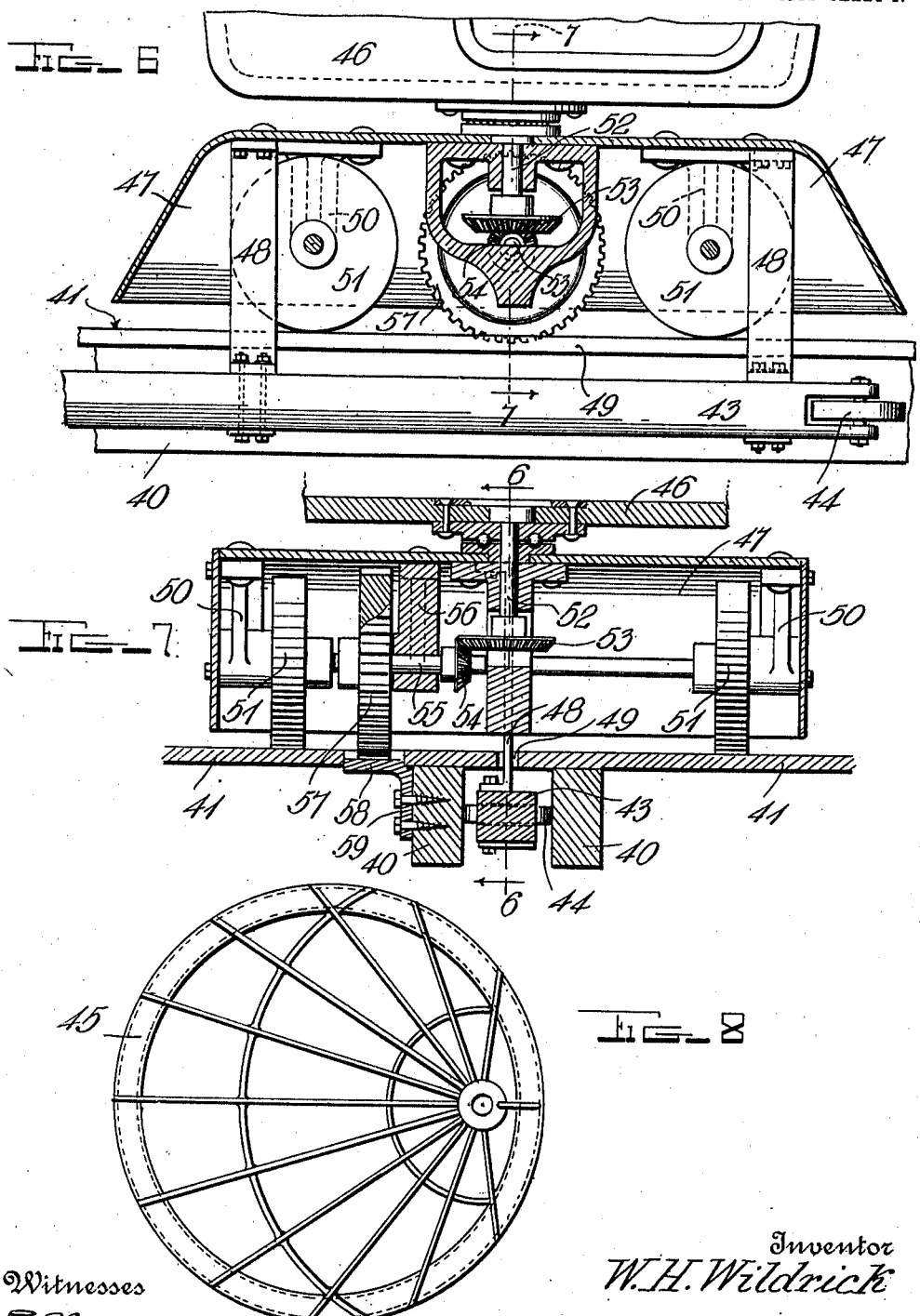

UNITED STATES PATENT OFFICE.

WARREN H. WILDRICK, OF PHILLIPSBURG, NEW JERSEY.

CAROUSEL.

988,419.  Specification of Letters Patent.  Patented Apr. 4, 1911.

Application filed November 7, 1910. Serial No. 591,198.

*To all whom it may concern:*

Be it known that I, WARREN H. WILDRICK, a citizen of the United States, residing at Phillipsburg, in the county of Warren and State of New Jersey, have invented certain new and useful Improvements in Carousels; and I do declare the following to be a full, clear, and exact description of the invention, such as will enable others skilled in the art to which it appertains to make and use the same.

This invention relates to improvements in carousels.

One object of the invention is to provide a carousel comprising a revoluble platform having arranged thereon a series of cars which are adapted to be reciprocated and independently revolved while being carried around by the revolving platform.

Another object is to provide means whereby the platform and cars are rocked up and down while being revolved.

A further object is to provide a carousel having a simple and improved mechanism for revolving the same and imparting to the cars their various individual movements.

With the above and other objects in view, the invention consists of certain novel features of construction, combination and arrangement of parts as will be more fully described and particularly pointed out in the appended claims.

In the accompanying drawings, Figure 1 is a plan view with parts of the platform and frame removed to show the operating mechanism which is arranged below the platform. Fig. 2 is a vertical sectional view on the line 2—2 of Fig. 1. Fig. 3 is an enlarged vertical sectional view of the central portion of the carousel. Fig. 4 is an enlarged horizontal sectional view of the central portion of the carousel on the line 4—4 of Fig. 3. Fig. 5 is a detail elevation of the frame rocking beam and operating means thereof. Fig. 6 is an enlarged vertical and longitudinal section through one of the cars and a portion of the platform and the operating devices for the car, taken on line 6—6 of Fig. 7. Fig. 7 is a vertical section of the same parts taken on the line 7—7 of Fig. 6. Fig. 8 is a plan view of the eccentric for reciprocating the cars.

In the illustrated embodiment of the invention, I provide a supporting frame comprising a lower series of radially disposed supporting bars 1 and an upper series of radially disposed supporting bars 2. The bars 1 are secured at their inner ends between upper and lower clamping plates 3 and 4, the lower plate 4 having formed thereon a centrally disposed bearing sleeve 5. The upper series of bars 2 are connected at their inner ends to upper and lower clamping plates 6 and 7, the lower plate 7 having formed thereon a centrally disposed bearing sleeve 8. The outer ends of the bars 1 and 2 are connected together by a series of tie rods 9 which extend through the bars and have applied to their ends fastening nuts 10. On the rods 9 are arranged spacing tubes 11 which fit between the corresponding bars 1 and 2 to maintain them the proper distance apart. The bars 1 and 2 are further connected together intermediate their ends by an inner series of connecting rods 12 the ends of which pass through the bars and have secured thereon suitable fastening nuts. The rods 12 are provided with spacing sleeves 13 similar to the sleeves 11 of the connecting rods 9. The bars 1 of the lower series are connected together at their outer ends by a ring 14 and between their ends by rings 15 and 16. The rings 14, 15 and 16 are preferably in the form of angle iron bands and between the rings and the bars 1 are arranged filling blocks 17. The lower ends of the rods 9 and 12 pass through the rings 14 and 15 before entering the bars and on said rods adjacent the rings are secured clamping nuts 18 whereby the rings are securely clamped to the bars 1. The rings 16 are securely fastened to the bars by clamping bolts 19, said bolts also serving as a fastening means for the angle iron track 20 which is secured to the lower sides of the bars 1 immediately below the rings 16 as shown.

The sleeves 5 and 8 of the supporting plates 4 and 7 fit loosely around the centrally disposed vertical shaft 21 which has a reduced upper end on which is secured a bearing block 22. Upon the block 22 rests a brace connecting block 23 which is revolubly mounted on the extreme upper end of the shaft 21 and has formed thereon an annular apertured flange 24 with which is connected the inner ends of a series of truss brace rods 25 in which are arranged turn buckles 26 whereby said rods may be shortened or lengthened. The outer ends of the truss rods 25 are bolted to the outer ends of the upper series of radial bars 2 and are further connected to the upper ends of the rods 9 by the nuts 10. By providing the turn buckles 26 in the rods 25 the frame of the carousel may be trued up and kept in true position with respect to the shaft 21.

The lower end of the shaft 21 is revolubly mounted in a cross head 27 having on its opposite ends journals 28 which are revolubly mounted in bearings 29 on the upper ends of pillow blocks or standards 30 which are arranged on suitable foundations of concrete or other material. By thus mounting the shaft 21 the latter and the frame are pivotally supported and may be rocked in the bearings 29 by a suitable rocking mechanism hereinafter described.

On the lower end of the shaft 21 is fixedly mounted a bevel gear 31 which is in operative engagement with a bevel gear pinion 32 fixedly mounted on the inner end of the main drive shaft 33, the inner end of which is revolubly mounted in a bearing 34 arranged on a suitable supporting base which preferably forms a part of the base of the pillow blocks 30. The outer portion of the shaft 33 is revolubly mounted in suitable bearings 35 arranged on supporting blocks 36. The shaft 33 extends from the bearings 35 beyond the opposite side of the carousel and is connected in any suitable manner to any suitable driving or operating mechanism. On the shaft 33 between the bearings 35 is fixedly mounted a driving pulley 37 which is in frictional engagement with the track 20 and through the same supports one side of the carousel. The opposite side of the carousel is supported upon an idle pulley 38 journaled in suitable bearings 39 arranged as shown. It will be noted that the points where the track 20 engages the pulleys 37 and 38 and the shaft 33 are in direct line or in the same vertical plane with the pivotal connection of the journals 28 with the bearings 29 so that the frame of the carousel may be readily rocked or tilted by means of a rocking mechanism hereinafter described.

Arranged at equidistant points around the rings 14, 15 and 16 of the frame are pairs of radially disposed guide and platform supporting bars 40 on the outer portions of which is arranged an annular platform 41. In the inner ends of the bars 40 are revolubly mounted pairs of anti-friction guide rollers 42 between which play car-reciprocating bars 43 which extend between the bars 40 and are provided at their outer ends with revolubly mounted anti-friction guide rollers 44 bearing against the opposed faces of the bars 40. By means of the rollers 42 and 44 the car reciprocating bars 43 are guided between the bars 40 and prevented from coming into frictional engagement therewith to retard the movement of the cars. The inner ends of the bars 43 are equipped with vertically disposed pins or rollers which engage the grooved rim of an eccentric 45, as shown in Fig. 3, said eccentric being fixedly mounted on and driven by the shaft 21 when the latter is revolved by the driving shaft 33 with which the same is connected through the bevel gears 31 and 32 as hereinbefore described.

Arranged on the platform 41 over each of the bars 43 are cars 46. The cars 46 may be of any suitable construction and are revolubly mounted on a suitable base 47 which as here shown is preferably in the form of a hollow inverted casing which is secured to the upper ends of the supporting standards 48 which project through slots 49 formed in the platform 41 and are connected at their lower ends to the reciprocating bars 43 which are disposed immediately below the slots in the platform.

Arranged in the bases 47 of the cars are pairs of bearing brackets 50 in which are revolubly mounted car supporting wheels 51 which are engaged and travel on the platform adjacent to the opposite sides of the slots 49. The cars 46 are connected to the upper end of a short depending operating shaft 52 which is revolubly mounted in suitable bearings in the base 47 and have on their lower ends bevel gears 53 which mesh with bevel gear pinions 54 fixedly mounted on the inner ends of drive shafts 55 which are revolubly mounted in suitable bearing brackets 56 secured to the upper side of the base 47 as shown. On the shafts 55 are fixedly mounted spur gears 57 which mesh with racks 58 arranged on supporting brackets 59 which are secured to one of the parallel guide bars 40 beneath the platform. By thus engaging the gear 57 with the rack 58 the gear shaft 55 will be revolved first in one direction and then the other as the cars are reciprocated back and forth on the platform 41 by the reciprocating bars 43 and cam 45. The movement of the shaft 55 when thus reciprocated, will be transmitted through the gear 54 and shaft 52 to the cars 46, thereby revolving the cars first in one direction and then the other as they are reciprocated back and forth in the manner described. In connection with the reciprocating and rotary movement of the cars, I also provide means whereby the frame and cars are rocked up and down while being carried around by the revolving frame. The means for rocking the frame up and down comprises a transversely disposed rocking bar or beam 60 which is pivotally mounted on the projecting end of one of the journals 28 of the cross head 27 as shown. The bar or beam 60 is hung or pivoted midway between its ends and has revolubly mounted on its opposite ends track engaging pulleys 61 which engage the under side of the track 20 whereby when the beam 60 is rocked the frame will be tilted or rocked up and down while the same is being revolved.

The operating mechanism for the beam 60 comprises a counter shaft 62 which is revolubly mounted in suitable bearings 63 and has fixed on one end a sprocket gear 64 which is connected by a chain 65 with a sprocket pinion 66 fixedly mounted on the adjacent inner end of the drive shaft 33 as the cars are reciprocated and a rocking shaft 62 is fixedly mounted a crank arm 67 which is connected by a pitman rod 68 to the beam 60 a suitable distance from the pivotal connection thereof whereby the beam is rocked on its pivotal support and thus rocks or tilts the frame of the machine first in one direction and then the other as the frame is being revolved. By regulating the size of the sprocket gearing which connects the counter shaft 62 with the main drive shaft 63, the beam and platform may be given any desired number of rocking movements to each revolution of the frame.

By means of the operating mechanism herein shown and described it will be readily seen that four distinct movements are imparted to the cars, to wit: a rotary movement which is effected by the revolution of the frame and platform; a reciprocating movement which is imparted to the cars by the reciprocating bars 43; an individual rotary movement which is imparted to the cars though the rack and gear connection when the cars are reciprocated and a rocking movement which is imparted to the cars by the rocking action of the platform through the medium of the rocking beam and operating mechanism connected therewith.

Motion being imparted to the driving shaft 33, the entire frame work will be rotated about the shaft 21 as a center through the frictional engagement of the pulley 37 with the ring 20. At the same time, the shaft 21 will be rotated in the opposite direction through the gearing 31, 32, and the eccentric 45 caused to act on the inner ends of the bars or rods 43 to impart a reciprocatory movement thereto as will be readily understood. The cars will, of course, follow the movements of the bars 43 and will be simultaneously rotated through the described gearing. The motion of the driven shaft will be transmitted through the sprocket gearing to the counter shaft 62 and the rocking beam thereby vibrated so as to rock the entire apparatus about the trunnions 28.

Various changes in the form, proportion and minor details of the invention may be resorted to without departing from the spirit or sacrificing any of the advantages of the invention as defined in the appended claims.

What is claimed is:

1. In a carousel of the character described, a supporting frame, a series of cars arranged thereon, means to revolve said frame and cars, means to simultaneously reciprocate the cars while being revolved with said frame, an independent revolving mechanism connected with said cars whereby the same are revolved while being carried around by the frame and reciprocated, and means to impart a rocking movement to the frame and cars as the same are revolved.

2. In a carousel of the character described, a revolubly mounted supporting frame having arranged thereon a platform, a series of cars slidably and revolubly supported on said platform, a main drive shaft, a driving pulley mounted on said shaft and having an operative engagement with said frame whereby the latter is revolved, a pivotally and revolubly mounted shaft arranged in the center of said frame and geared to said drive shaft, an eccentric fixedly mounted on said shaft, a series of slidably mounted car reciprocating bars connected to said eccentric wheel and to the cars whereby the latter are reciprocated while being carried around by the supporting frame, and means actuated by the reciprocating movement of the cars to independently revolve the same.

3. In a carousel of the character described, a supporting frame having arranged thereon a platform, a series of cars slidably and revolubly supported on said platform, a supporting shaft arranged in the center of the frame, means to pivotally support said shaft whereby the same and said frame may be tilted or rocked, a main drive shaft connected to said vertical shaft, a car reciprocating mechanism operated by said shaft whereby the cars are reciprocated, a rack and pinion car revolving mechanism adapted to individually revolve the cars as the latter are reciprocated, a rocking mechanism comprising a counter shaft geared to said main drive shaft, a rocking beam pivotally supported midway between its ends, rocking pulleys revolubly mounted on the opposite ends of said beam, and a crank and pitman rod connection between said beam and said counter shaft whereby the movement of the drive shaft is imparted to the beam to rock the same and the frame of the carousel.

4. In a carousel of the character described, a supporting frame, a platform arranged on said frame, a series of cars pivotally and slidably supported on said platform, said cars comprising a base, a shaft revolubly mounted in the top of said base and connected to the body of the car whereby the latter is revolubly supported, a drive shaft geared to said vertically disposed shaft, a gear mounted on said drive shaft, a rack secured to the frame of the carousel and in mesh with said gear whereby when the car is reciprocated on said platform, the drive shaft will be operated by the engagement of the gear with said rack thereby revolving the body of the car on said base, and a reciprocating mechanism connected with the base of the car whereby the latter is reciprocated and independently revolved.

5. In a carousel of the character described, a revolubly mounted shaft, a supporting frame revolubly mounted on said shaft, means to revolve said frame, a platform arranged in said frame, a series of cars slidably mounted on said platform, a car reciprocating mechanism comprising a cam fixedly mounted on said shaft, pairs of radially disposed guide rods, car reciprocating rods slidably mounted between said guide rods and operatively connected at their inner ends to the cam on said shaft, and means to connect the outer ends of said bars to said cars whereby the latter are reciprocated by said cam while being carried around by the frame and platform.

6. In a carousel of the character described, a revolubly mounted supporting frame having arranged thereon a platform, a series of cars slidably mounted on said platform, a car reciprocating mechanism adapted to radially reciprocate the cars while being carried around by the platform, a wheeled supporting base arranged beneath said cars, a car supporting and operating shaft revolubly mounted in said base, a bevel gear fixed on the lower end of said shaft, a drive shaft revolubly mounted in said base, a bevel gear on one end of said shaft adapted to engage the bevel gear on the lower end of the car operating shaft, a spur gear pinion on the opposite end of said drive shaft, a rack secured to the frame of the carousel with which said spur gear is adapted to be operatively engaged when the cars are reciprocated thereby driving said operating shaft and revolving the cars on their bases, and means to impart a rocking movement to the frame and platform while the same are being revolved.

7. In a carousel of the character described, a revolubly mounted supporting frame comprising a centrally disposed revolubly and pivotally supported shaft, upper and lower series of radially projecting supporting bars loosely mounted on said shaft, means to secure said bars together in spaced relation, means whereby the same are braced, a series of platform supporting rings arranged on said bars, pairs of radially disposed guide bars secured to said rings, an annular platform arranged over and supported by said guide bars, said platform having formed therein a series of radially disposed slots, a series of car reciprocating bars slidably mounted between said guide bars, anti-friction rollers arranged in the inner ends of said car reciprocating bars and the outer ends of said guide bars, a series of cars arranged on said platform over said slots, means to operatively connect said cars with said reciprocating bars whereby the cars are reciprocated back and forth over the platform, an eccentric arranged on said shaft and having an operative connection with the inner ends of said car reciprocating bars, an annular track arranged below and secured to the under side of said lower series of radial supporting bars, a supporting pulley adapted to be engaged by said track at one side of the frame, a drive pulley adapted to frictionally engage said track at the opposite side of the frame, means to drive said friction pulley whereby the frame is revolved, and means to revolve said pivoted shaft independently of said frame and thereby operate said car reciprocating mechanism.

8. The combination of a supporting frame, a series of cars thereon, means to reciprocate the cars, means to simultaneously rotate the cars, and means to rock the frame.

9. The combination of a supporting frame having a platform thereon, a series of cars slidably and revolubly supported on said platform, a main drive shaft, a pivotally and revolubly mounted shaft on the center of said frame and geared to said drive shaft, an eccentric fixedly mounted on said shaft, a series of slidably mounted car reciprocating bars connected to said eccentric and to the cars, and means actuated by the reciprocating movement of the cars to independently revolve the same.

10. The combination of a pivotally mounted platform, a series of cars on said platform, a main drive shaft, means actuated by said shaft to impart movement to the cars, a rocking beam mounted below the platform and having its ends arranged to bear against the under side of the platform, a counter shaft, sprocket gearing connecting said shaft to the driving shaft, a crank on the counter shaft, and a pitman connecting said crank with one end of the rocking beam.

In testimony whereof I have hereunto set my hand in presence of two subscribing witnesses.

WARREN H. WILDRICK.

Witnesses:
MARSHALL MILLER,
JOHN M. CODY.